US009258579B1

(12) United States Patent  
Reeves et al.

(10) Patent No.: US 9,258,579 B1
(45) Date of Patent: Feb. 9, 2016

(54) TEMPORAL SHIFT OF OBJECT RESOLUTION AND OPTIMIZATION

(75) Inventors: Raymond Emilio Reeves, Olathe, KS (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 329 days.

(21) Appl. No.: 13/173,232

(22) Filed: Jun. 30, 2011

(51) Int. Cl.
*G06F 15/16* (2006.01)
*H04N 21/2343* (2011.01)
*H04N 21/24* (2011.01)

(52) U.S. Cl.
CPC ..... *H04N 21/23439* (2013.01); *H04N 21/2402* (2013.01)

(58) Field of Classification Search
USPC .......................................................... 709/236
See application file for complete search history.

(56) References Cited

U.S. PATENT DOCUMENTS

| | | | | |
|---|---|---|---|---|
| 6,097,877 A * | 8/2000 | Katayama | ............ | H04N 9/8047 375/E7.273 |
| 6,243,761 B1 * | 6/2001 | Mogul | .................... | H04L 29/06 709/217 |
| 6,760,379 B1 * | 7/2004 | Werner | .................. | H03H 17/06 348/392.1 |
| 8,050,289 B1 * | 11/2011 | Masterson | ......... | H04N 21/2343 370/465 |
| 8,682,722 B1 * | 3/2014 | Des Jardins | ............ | G10H 1/26 455/3.01 |
| 2008/0235731 A1 * | 9/2008 | Bryant | ............... | H04N 5/44543 725/44 |
| 2010/0005499 A1 * | 1/2010 | Covey | ................. | H04L 12/1827 725/109 |
| 2011/0026414 A1 * | 2/2011 | Banerjee | ............... | H04L 1/0002 370/252 |
| 2011/0066673 A1 * | 3/2011 | Outlaw | ............... | H04L 65/4092 709/203 |
| 2012/0105637 A1 * | 5/2012 | Yousefi | .................. | H04N 7/183 348/148 |
| 2012/0203924 A1 * | 8/2012 | Dote | ..................... | G06F 9/4443 709/232 |
| 2012/0208512 A1 * | 8/2012 | Maharajh | .......... | G06F 17/30035 455/414.1 |
| 2012/0259950 A1 * | 10/2012 | Havekes | ............. | H04L 65/4084 709/217 |
| 2012/0269275 A1 * | 10/2012 | Hannuksela | ....... | H04N 13/0048 375/240.25 |
| 2012/0272285 A1 * | 10/2012 | Brooks | ............ | H04N 21/23439 725/146 |
| 2012/0284736 A1 * | 11/2012 | Friedman | ............... | H04H 20/26 725/14 |
| 2013/0227615 A1 * | 8/2013 | Bryant | ............... | H04N 5/44543 725/58 |

OTHER PUBLICATIONS

Trestian, Ionut. "Taming User-Generated Content in Mobile Networks via Drop Zones."
Lee, Sangmi. "Adapting Content for Mobile Devices in Heterogeneous Collaboration Environments".
Clotfelter, Christopher. "Twiddlenet: Metadata Tagging and Data Dissemination in Mobile Device Networks." Naval Postgraduate School. Monterey, California. Published Sep. 2007.
Yung-Hsiang Lu. "Resource-Driven Content Adaptation".

* cited by examiner

*Primary Examiner* — Hamza Algibhah
*Assistant Examiner* — James Edwards

(57) ABSTRACT

A method, system, and media are provided for delivery of content from a communication device. A temporal shifting server enables delivery of temporal shifting messages. The temporal shifting server checks conditions associated with a communication network connected to the communication device and determines whether conditions of the communication network support delivery of content stored in a large file. If the communication network can support the large file, the large file is communicated over the communication network to a recipient and a copy may be retained by the temporal shifting server. If the communication network is unable to transmit the large file, the temporal shifting server generates an identifier for the content, transmits the identifier to the communication device, receives a small file that stores a version of the content, and stores the small file.

20 Claims, 5 Drawing Sheets

TEMPORAL SHIFT OF OBJECT RESOLUTION AND OPTIMIZATION

SUMMARY

Embodiments of the invention are defined by the claims below, not this summary. A high-level overview of embodiments of the invention is provided here for that reason, to provide an overview of the disclosure. Embodiments of the invention are defined by the claims below. Embodiments of the invention provide wireless devices, methods, and computer-readable media for, among other things, delivering temporally shifted messages to a recipient. The embodiments of the invention have several practical applications in the technical arts including postponing delivery of large files having high-resolution content until better conditions exist. Simultaneously, a smaller file having a low-resolution alternative of the content is made immediately available for delivery over the communication network until the large file may be transmitted over the communication network.

In a first aspect, a set of computer-useable instructions provides an illustrative method for delivery of content from a communication device. The communication device obtains conditions associated with a communication network connected to the communication device. In turn, the communication device may determine whether conditions of the communication network, including available network bandwidth, support delivery of content stored in a large file. When the conditions indicate that the communication network is able to transmit the large file, the communication device transmits the large file over the communication network to a recipient specified by a user of the communication device. When the conditions indicate that the communication network is unable to transmit the large file, the communication device reformats the large file for immediate delivery to the user. For instance, the communication device may generate a small file that stores a version of the content and transmits the small file over the communication network to the recipient specified by the user of the communication device.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
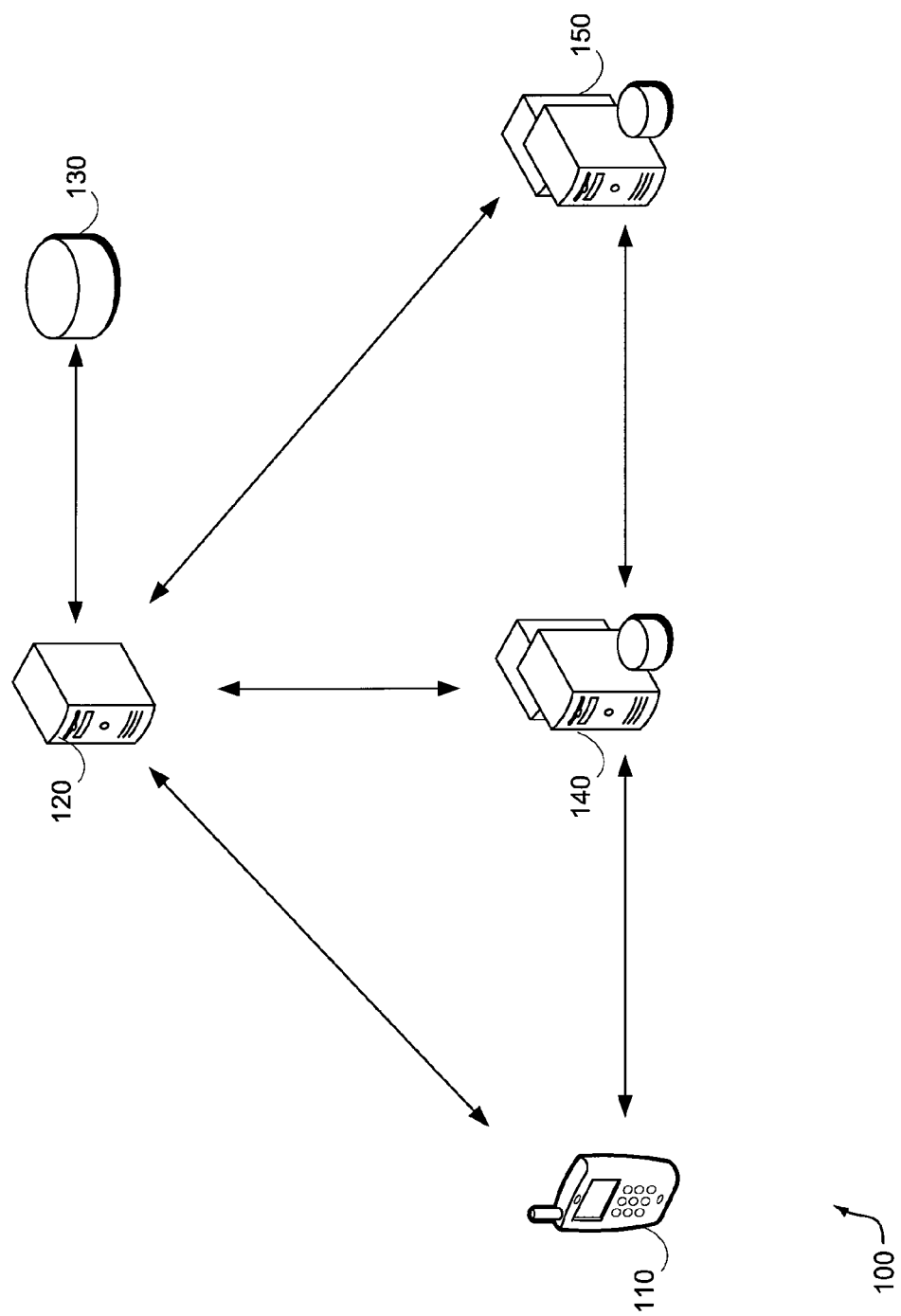
FIG. 1 is a network diagram of an exemplary network environment suitable for implementation of embodiments of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention provide computer systems, computer-implemented methods, and computer media for delivery of content across a communication network operated by a communication carrier. Usually, communication carriers aim to cost-effectively deliver content to intended recipients. In one embodiment, a temporal shifting architecture is provided for content, including user-authored content, to enable immediate delivery of a version of the content to intended recipients. The temporal shifting architecture includes temporal shifting servers and temporal shifting agents. The temporal shifting servers and temporal shifting agents are deployed in the communication network to allow a communication device to deliver content consistent with network conditions available to the communication device. In some embodiments, the temporal shifting servers may postpone uploading of a large file having high-definition content or high-resolution content until preferable conditions exist, e.g. public WiFi networks. At the same time, the communication device may upload a low-resolution alternative that is available for distribution over a communication network until the high-resolution content is fully uploaded. Accordingly, communication carriers may offer incentives for users to utilize a temporal shifting delivery of content, or the carriers may automatically decide when to implement temporal shifting delivery based on current load on the carriers' communication networks.

In one embodiment, users may have the ability to decide whether to delay transmission of large files that contain high-resolution content. Delaying delivery of the large file may reduce contention for the available bandwidth on the communication network. Thus, the temporal shifting architecture may reduce the number of denial of service messages generated for the communication network.

Users may set acceptable delays for receiving the large file having the high-resolution content. In some embodiments, the user may specify that they always want to send only large files with high-resolution content regardless of network conditions. Alternatively, the user may specify that it prefers to send large files with high-resolution content based on network conditions, where a small file with low-resolution content would be acceptable for immediate delivery to the intended recipient. In some embodiments, the temporal shifting server and wireless device may exchange user preferences during the handshake and negotiation phase of session initialization between the temporal shifting server and wireless device. For instance, the preferences may include an appropriate time to upload large content, acceptable delay for a user, user preference for transport based on network conditions, etc.

When the network conditions are such that the large file would take a long time to send, the communication device may generate a low-resolution version of the file that is stored in a small file as compared to the large file for the high-resolution version of the content. In one embodiment, when the communication device transmits a message including the low-resolution file, the message may contain a link that points to the temporal shifting server. In turn, the intended recipient of the message may utilize the link to access the version of the content stored by the temporal shifting server.

The temporal shifting agents are deployed throughout the communication network, including on the communication device, gateways, and content providers. The agents provide on-the-fly updates between small files containing low-resolution versions of the content and large files containing high-resolution versions of the content. Accordingly, the gateways and content providers may receive the most recent version of the content available from the temporal shifting server.

In one embodiment, the temporal shifting agent on the mobile device is dynamically updated by the temporal shifting server. For instance, the agent may receive updates for file format types, optimization algorithms, and transcoding formats. If a communication device is configured to generate three-dimensional video and transmit the three dimensional video over the communication network, the temporal shifting agent on the communication device may receive updates to the compression formats available for the three-dimensional video from the temporal shifting server or a third party that manages the three-dimensional video codec or compression formats. Also, the optimizers on the communication device may be updated with the optimization algorithms received by the temporal shifting agent on the communication device.

Throughout the description of the embodiments of this invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. Further, various technical terms are used throughout this description.

The following is a nonexhaustive list of these acronyms:
3G Third-Generation Wireless Telephone Technology
4G Fourth-Generation Wireless Telephone Technology
BSC Base Station Controller
CDMA Code Division Multiple Access
CD-ROM Compact Disk Read Only Memory
DVD Digital Versatile Discs
EEPROM Electrically Erasable Programmable Read Only Memory
GPRS General Packet Radio Service
GSM Global System for Mobile Communications
iDEN Integrated Digital Enhanced Network
IP Internet Protocol
I/O Input/Output
MMS Multimedia Messaging Service
PC Personal Computer
PCS Personal Communications Service
PDA Personal Digital Assistant
PTT Push to Talk
RAM Random Access Memory
ROM Read Only Memory
SMS Short Message Service
TDMA Time Division Multiple Access
UMTS Universal Mobile Telecommunications Systems
WiMAX Worldwide Interoperability for Microwave Access Embodiments of the invention may be embodied as, among other things: a method, system, or computer-program product. Accordingly, the embodiments may take the form of a hardware embodiment, a software embodiment, or an embodiment combining software and hardware. In one embodiment, a computer-program product includes computer-useable instructions for the method and is embodied on one or more computer-readable media.

Computer-readable media include both volatile and non-volatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

In one embodiment, a temporal shifting system includes temporal shifting servers and temporal shifting agents. The temporal shifting agents are available on communication devices and network components, e.g., gateways, switches, or content providers. The temporal shifting servers and temporal shifting agents are deployed in the communication network to provide end-end coverage for temporally shifted communications having content that may include high-definition versions. Thus, an intended recipient of temporally shifted communications may retrieve the best available version of the content via the content provider or temporal shifting servers.

FIG. 1 is a network diagram of an exemplary network environment 100 suitable for implementation of embodiments of the invention. The network environment 100 includes a communication device 110, temporal shifting server 120, temporal shifting database 130, gateway 140, and content provider 150.

The network environment 100 illustrates a temporal shifting system that allows the communication device 110 to transmit high-definition content based on network conditions. For instance, the communication device 110 may have a connection with low or limited bandwidth availability at the moment when it elects to transmit the high-definition content. The temporal shifting system may inform the communication device 110 of the suboptimal network conditions. In turn, the communication device 110 may opt to transmit a small file having a low-definition version of the high-definition content. In some embodiments, the communication device 110 may generate the low-definition version and transmit the low-definition version in a message to an intended recipient. The intended recipient may receive the message, and access the low-definition content immediately. In some embodiments, if the network conditions for the communication device 110 improve as the intended recipient is streaming or downloading the low-definition version of the content, the temporal shifting system may seamlessly replace the low resolution version of the content with the high-definition version of the content.

Alternatively, the intended recipient may receive the message from the communication device 110 but not access the low-definition content. For instance, the intended recipient may be busy or unavailable when the message having the low resolution version of the content arrives. In this case, when the network conditions for the communication device 110 improves, the temporal shifting system may obtain the high-definition version of the content from the communication device 110 and update a reference in the message received by the intended recipient to point to the high-definition version of the content instead of the low-definition version of the content.

The communication device 110 is communicatively connected to the temporal shifting server 120 and gateway 140.

The communication device 110 may access the database 130 via the temporal shifting server 120. The intended recipient may be accessed via the gateway 140.

In one embodiment, the communication device 110 is configured to be network aware. In other words, the communication device 110 may periodically request network conditions associated with its connection to the communication network. In alternate embodiments, the communication network may automatically push network conditions to the communication device 110. The communication device 110 may utilize the network conditions, e.g., bandwidth availability, congestion, signal strength, etc., to decide whether to transmit a high-definition version of the content or a low-definition version of the content.

In some embodiments, the communication device 110 is configured with a temporal shifting agent that includes various handlers that are used to reformat the high-definition version of the content to the low-definition version of the content. The handlers may include codecs, application updates, or optimizations for the content generated by the communication device 110. The communication device 110 may automatically trigger the temporal shifting agent to make any needed modifications to the content prior to including the content in a message for the intended recipient. The temporal shifting agent may communicate with the temporal shifting server 120 to obtain updates to handlers for the content and for identifiers that are used as pointers for the version of the content that is included in the message. This version of the content may also be stored by the temporal shifting server 120.

The temporal shifting agent executed by the communication device 110 is application-aware and content-aware. In other words, the temporal shifting agent may obtain appropriate handlers to interface with a content authoring application executed by the communication device. Also, the temporal shifting agent 120 obtains the handlers that are best suited for the format of the content. In some embodiments, the format handler, e.g. three-dimensional video formats, may be periodically updated. Thus, the temporal shifting agent is configured to access the most-recent version of the handler available for the content.

In certain embodiments, the communication device 110 may be multimodal. For instance, the communication device 110 may be configured with multiple radios that allow the communication device to connect to various networks, including WIFI and WiMAX communication networks. Here, the communication device 110 may receive network conditions for the multiple communication networks. In turn, the communication device 110 may determine that no available network currently has capacity to transmit the high-definition version of the content. Thus, the communication device 110 utilizes the available handlers to reformat the content to the low-definition version of the content and transmit this version of the content over the best available network, i.e., the network with stronger signals, more bandwidth availability, etc. In some embodiments, the communication device may default to a preferred network when transmitting the message with the high-definition version of the content or the low-definition version of the content.

The communication device 110 may send the message without altering the definition of the high-definition content. For instance, when the communication device is configured not to reduce the definition of the content, the communication device 110 may attempt to transmit a message having the high-definition version of the content without regard for the network conditions. In some embodiments, the temporal shifting server 120 may store a copy of each message transmitted by the communication device 110 if the user opts in to message storage by the temporal shifting server 120.

In one embodiment, the temporal shifting server 120 is communicatively connected to the communication device 110, database 130, gateway 140, and content provider 150. The temporal shifting server 120 is configured to store a version of the content received from the communication device 110. The temporal shifting server 120 may also be configured to provide updated handlers or application patches to the communication device 110. Accordingly, the temporal shifting server 120 may act as an aggregation point for versions of the content received from the communication device 110. The version of the content received from the communication device 110 may be associated with an identifier generated by the temporal shifting server. The identifier may be a unique identifier that enables storing of content, replacement of content, and service of content to, among others, the intended recipients, communication device 110, gateway 140, or content provider 150. In one embodiment, the communication device 110 associates the identifier with the version of the content transmitted to the temporal shifting server 120.

The temporal shifting server 120 stores the version of the content transmitted from the communication device in database 130. In turn, the temporal shifting server 120 tracks the transmission path of the message containing the version of the content and replaces the version of the content included in the message with an updated version if the communication device 110 provides a new version of the content. In one embodiment, the version of the content may be a low-definition version. Alternatively, the version that is initially transmitted may be a version of the content that utilized an outdated codec. The updated version may include a high-definition version of the content. Alternatively, the updated version may be a version that utilized the updated codec.

The temporal shifting server 120 may provide updates for optimization components executed by the communication device 110. The optimization components may include compression algorithms, format conversions, codecs, etc. The optimization components allow the communication device 110 to appropriately format the version of the content for transmission in the message. Thus, the temporal shifting server 120 may receive the appropriately formatted version of the content included in the message. The version of the content, in certain embodiments, varies depending on the network conditions. When the network conditions are favorable, the version of the content is a high-definition version. For instance, favorable network conditions include strong signal strength, excess bandwidth capacity, etc. When the network conditions are unfavorable, the version of the content is a low-definition version.

In some embodiments, the temporal shifting server 120 generates notifications when the stored version of the content is updated by the communication device 110. The update and notification may be transmitted to the intended recipient, gateway 140, or content provider 150. The notification may be a message that is formatted to include the updated version of the content. In one embodiment, the notification message may include a copy of the updated version of the content. In other embodiments, the notification message includes a pointer to the updated version of the content.

The temporal shifting server 120 may be communicatively connected to a temporal shifting database 130. The database 130 may be configured to record the content received by the temporal shifting server 120. In some embodiments, the temporal shifting database 130 is configured to store and track the versions of the content received from the communication device 110.

The database 130 may provide life-cycle management for the versions of the content received from the communication device 110. In some embodiments, the versions of the content stored by the database are retained for a specified period of time, e.g., 90 days. Once the specified period of time has expired, the versions of the content in the database 130 are deleted unless the user of the communication device 110 requests that the database 130 retain the versions of the content for a longer period of time. In some embodiments, the user may be offered incentives to minimize the period of time that the versions of the content are retained. For instance, the user may specify that low-definition versions of the content are retained for 5 days and high-definition versions of the content are retained for 30 days. The provider implementing the temporal shifting system may decide to offer the user a ten % discount on the service fee for the temporal shifting system based on the reduced retention period.

In certain embodiments, the database 130 creates a record that stores the version of the content and associated identifier received from the communication device 110. In some embodiments, the version specifies whether the content is high-definition or low-definition. In turn, the record is stored in the database 130. The identifier associated with the version of the content may be used as a pointer to access the record. The database may check a storage policy associated with the user of the communication device 110 to verify that the user may store additional content in the database 130. The storage policy associated with a user may limit the space in the database 130 available for the user. Thus, the database 130 may check the total storage space currently used by the user before committing a record to the database 130. If the temporal shifting server 120 determines that storing the record in the database will violate the storage policy for the user, the temporal shifting server 120 may notify the user that the storage policy is violated and request that the user remove several records from the database 130. In some embodiments, the temporal shifting server 120 may suggest that the user remove records that are infrequently used. The suggestions from the temporal shifting server 120 may include the least frequently used records for both records for high-definition content and records for low-definition content.

In other embodiments, upon detecting a violation of the storage policy, the temporal shifting server 120 may automatically lower the definition of the versions of the content stored in the database 130. For instance, the temporal shifting server 120 may locate each record having high-definition content for the user and reduce the definition of the content. Alternatively, the temporal shifting server 120 may remove the records associated with the user based on record size. In one embodiment, the temporal shifting server removes the larger records first.

In certain embodiments, the gateway 140 and content provider 150 execute a temporal shifting agent. The temporal shifting agent is configured to periodically communicate with the temporal shifting server 120 and to receive updated versions of content received by the temporal shifting server 120. For instance, a message received by the gateway 140 or content provider 150 may include a header having a tag that specifies the message as a temporal shifting message. In turn, the temporal shifting agent may parse the header and extract the tag. The tag includes an identifier for the version of the content stored by the temporal shifting server 120. The temporal shifting agent utilizes the tag to access the temporal shifting server and to update the reference to the version of the content stored by the temporal shifting server if a newer version of the content is available. Thus, the temporal shifting agent may replace low-definition versions of content referenced in the temporal shifting message with high-definition versions of the content that become available. In some embodiment, the high-definition version of the content may replace the low-definition version of content during transmission of the temporal shifting message to the intended recipient.

The illustrated elements of network environment 100 are meant to be exemplary in nature, and the various lower-level details of the elements are not elaborated on so as to not obscure the embodiments of the invention. Clearly, some of the elements may be absent in some embodiments of the invention, and additional elements not shown may also be part of network environment 100. Attempting to show all of the various elements of network environment 100 would obscure certain novel aspects, and we will refrain from such elaboration at least for the sake of brevity.

A communication device that is utilized to author content may include various components. For instance, the communication device may include a processor and storage components that are utilized by content authoring applications to create high-definition content. The communication device may include an image capture or video capture component that captures a place, person, event, or thing. This creates content that may be transmitted across a network that the communication device is connected to.

Figure 2:
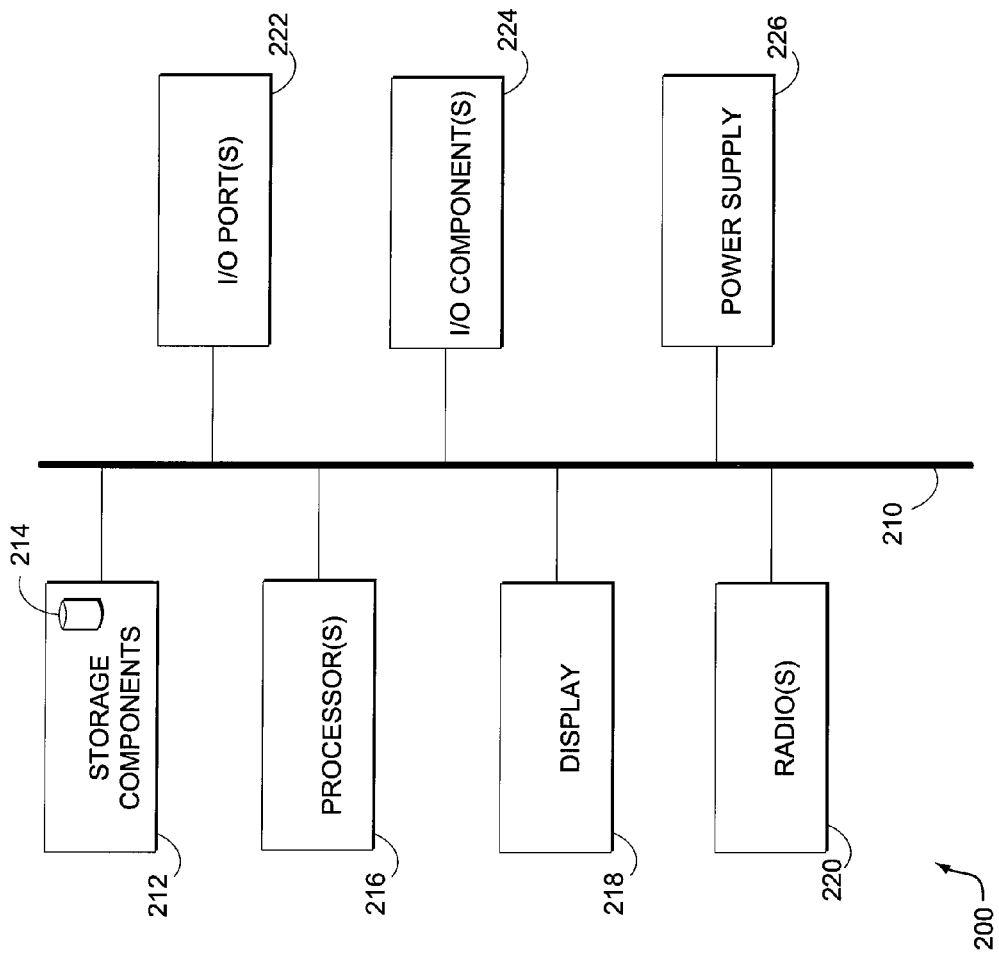
FIG. 2 is a block diagram of an exemplary communication device that is suitable for operation with embodiments of the invention.

FIG. 2 is a block diagram of an exemplary communications device 200 that is suitable for operation with embodiments of the invention. The communication device 200 includes, among other components, a bus 210, storage 212, processors 216, display 218, radio 220, I/O ports 222, I/O components 224, and power supply 226. FIG. 1 depicts the components that will generally be included in the communication device 200 to facilitate various functional aspects of embodiments of the invention. As shown, the bus 110 couples, directly or indirectly, the following illustrative components: the storage component 212, the processor 216, the display 218, the radio 220, the I/O ports 222, the I/O components 224, and the power supply 226.

Storage components 212 may take the form of the aforementioned computer-readable media. As with all of the illustrative components of FIG. 2, although we refer to them sometimes in the singular, that should not be read as to imply that only a single of each of the components is contemplated within the scope of our invention. To the contrary, by way of example, storage component or components 212 may actually be composed of constituent storage components located within communication device 200. A portion or separate storage component includes data store 214. In one embodiment, as will be explained in greater detail below, data store 214 can be used to store the format handlers, the version of content transmitted to the temporal shifting server, and network conditions observed by the communication device 200.

Processors 216 facilitate a flow of information among all or a portion of the components shown in FIG. 2 as well as executing computer-usable instructions that help facilitate various aspects of the embodiments of the invention. For example, in one embodiment, the temporal shifting agent executed by the processor 216 of the communication device 200 coordinates various functional aspects of the embodiments of the invention. Processors 216 operate in connection executing the temporal shifting agent. Processor 216 might actually be multiple processors that receive instructions and process them accordingly.

Display component 218 includes the likes of a monitor, a speaker, as well as other components that can present information (such as a lamp (LED), or even lighted keyboards).

Radios 220 facilitate the communication of wireless communication signals to and from communication device 200. Illustrative protocols that can be utilized in connection with an embodiment of the present invention include CDMA, TDMA, GSM, GPRS, EVDO, etc. The radios 220 facilitate wireless communications between the communication device 200 and a national or even global telecommunications network. In some embodiments, radio 220 might also facilitate other types of wireless communications including Wi-Fi communications and GIS communications.

Input/output ports 222 provide a way for communication device 200 to interact with other peripheral components. Illustrative input/output ports include an ear-piece or headphone jack, a USB port, an infrared port, and the like. Different input/output ports could be provided as is needed to facilitate communication of other peripheral components.

Input/output components 224 include items such as keyboards, microphones, touch screens, and any other item usable to directly or indirectly input data into communication device 200. In one embodiment, input/output components 224 include a vibrating component that enables communication device 200 to experience a vibrating action incident to an occurrence of different events. The vibrating component may take on a variety of forms, such as a motor that operates with an offset mass. In one embodiment, vibrating component 224 takes the form of a haptics motor.

Power supply 226 may also take on a variety of forms ranging from a battery to a charging mechanism to other forms of power sources that serve to provide power to communication device 200. Power supply 226 includes items such as batteries, fuel cells, or any other component that can act as a power source to power communication device 200.

It will be understood and appreciated by those of ordinary skill in the art that the communication device 200 shown in FIG. 2 is merely an example of one suitable communication device 200 and is not intended to suggest any limitation as to the scope of use or functionality of the embodiments of the invention. Neither should the communication device 200 be interpreted as having any dependency or requirement related to any single component or combination of components illustrated therein. The single unit depictions are meant for clarity, not to limit the scope of embodiments in any form.

The temporal shifting architecture includes temporal shifting servers and temporal shifting agents deployed throughout a communication network. A communication device configured with a temporal shifting agent may transmit high-definition content to an intended recipient based on network conditions. In some embodiments, a temporal shifting server may track versions of the content received from the communication device and provide access to the most recent version of the content.

Figure 3:
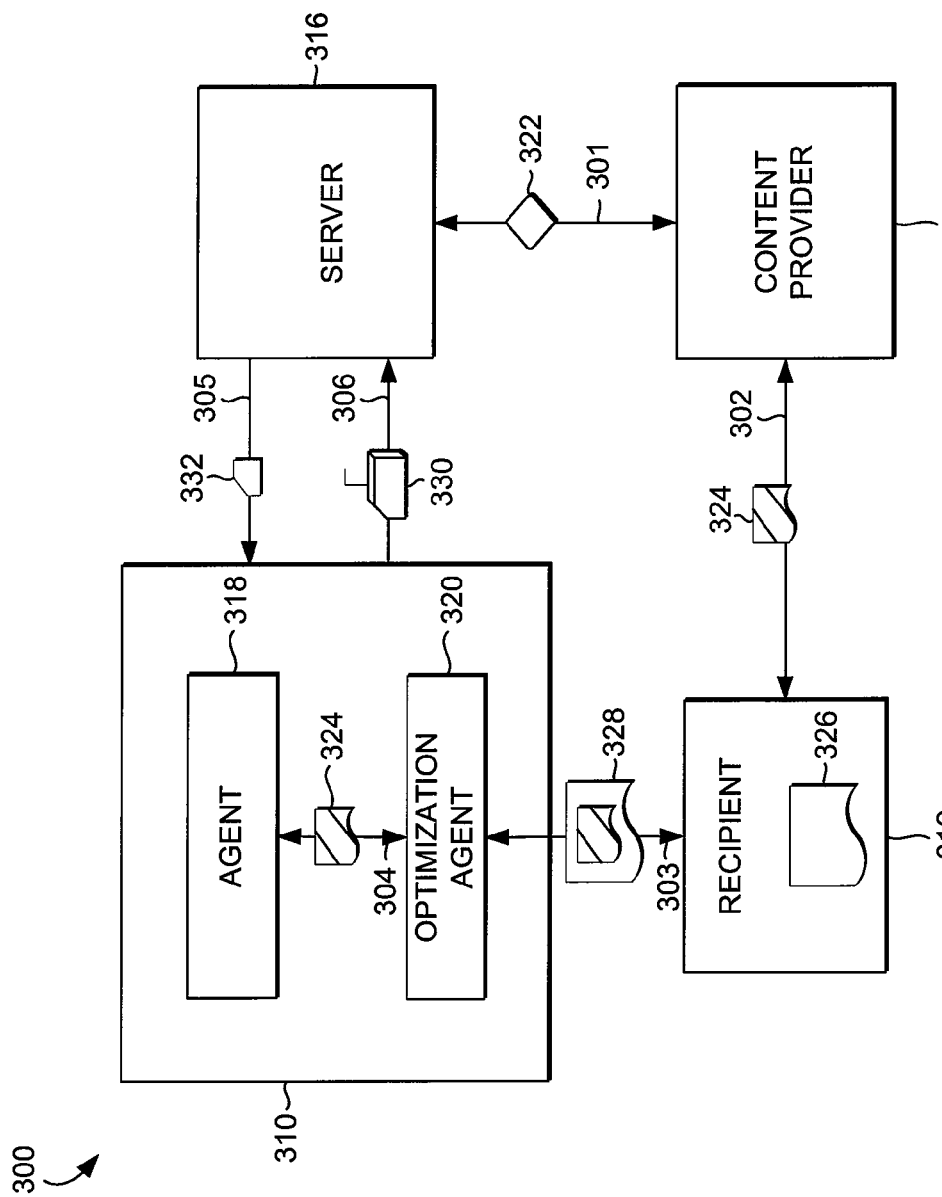
FIG. 3 is a schematic diagram showing illustrative communications within an exemplary network environment in accordance with embodiments of the invention.

FIG. 3 is a schematic diagram showing illustrative communications within an exemplary network environment in accordance with embodiments of the invention. The exemplary network environment is a temporal shifting architecture 300 that implements various functions of the embodiments of the invention. The temporal shifting architecture 300 includes, among other things, communication connections 301-306, a communication device 310, a recipient's device 312, content provider 314, and temporal shifting server 316.

The communication connections 301-306 are routing paths for messages generated by the temporal shifting architecture 300. In some embodiments, the communication connections 301-306, include bus connections, the Internet, and telephone networks. For instance, the networks may include a cable network, a wireless network (e.g., a wireless telecommunications network), or a combination thereof or portions thereof. A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). A wireless telecommunications network might include an array of devices, which are not shown so as to not obscure more relevant aspects of the invention. Components such as a base station controller (BSC), a communications tower, or even access points (as well as other components) can provide wireless connectivity in some embodiments.

The communication device 310 and recipient's device 312 may take on a variety of forms, such as a personal computer (PC), a laptop computer, a wireless phone, a personal digital assistant (PDA), or any other device that is cable of communicating messages. In some embodiments, the communication device 310 and recipient's device 312 communicate over a wireless telecommunications network.

The communication device 310 is utilized to communicate messages to one or more recipient devices 312, or recipients associated therewith, via a service. As used herein, a message refers to any message that can be communicated to a recipient or a recipient device 312 (e.g., via a service) from the communication device 310 or user associated therewith. A user can generate a message (i.e., a user-generated message) using the communication device 310. In this regard, a user can input a message by way of the communication device 310, for example, using voice, SMS, MMS, PTT, video, image, text, a stylus, motion, or any other means capable of inputting a message that is directed to one or more recipients.

In some embodiments, the communication device 310 includes a temporal shifting agent 318 and optimization agent 320. The temporal shifting agent 318 is configured to execute on the communication device and determine whether a high-definition version of content in a message 324 or large file should be transmitted over the communication network. The temporal shifting agent 318 obtains the message 324 from an application executing on the communication device 310. In turn, when the temporal shifting agent 318 determines that favorable network conditions exist for transmitting a message 324 having a large file that represents the high-definition content, the temporal shifting agent 318 provides the message 324 to the optimization component 320. The optimization component 320 performs the required optimizations, including compression and formatting, and provides an optimized message 328 for transmission to the recipient's device 312. The communication device transmits the optimized message 328 to the recipient's device 312 over connection 303.

In an alternate embodiment, when the temporal shifting agent 318 determines that favorable network conditions do not exist for transmitting a message 324 having the large file that represents the high-definition content, the temporal shifting agent may generate a request for an identifier 332 from the temporal shifting server 316. The temporal shifting server 316 may generate an identifier 332 based on any combination of the following: the address associated with the communication device, e.g., telephone number, IP address, etc; time of the request; current geographical region of the device; or server address. The temporal shifting server 316 transmits the identifier 332 to the communication device 310 over connection 305. In turn, the temporal shifting agent 318 receives the identifier 332 and reduces the definition of the high-definition content to create a small file that represents the low-definition version of the content. In certain embodiments, the temporal shifting agent 318 utilizes updated handlers received from the temporal shifting server 316 to create the low-definition version of the content. In an alternate embodiment, the updated handlers are received by the optimization agent 320, which utilizes the updated handlers to create the low-definition version of the content. In turn, the temporal shifting agent 318 transmits message 330 having the small file that represents the low-definition version of the content and the associated identifier 332 to temporal shifting server 316 over connection 306. Temporal shifting server 316 receives the message 330 and stores it. Concurrently with transmission of message 330, the temporal shifting agent 318, in some embodiments, provides message 324 having the small file to optimization component 320, which optimizes the message 324 before the communication device 310 transmits optimized message 328 to the recipient's device 312.

A message 324, 328, or 330 might be, for instance, a voicemail message, PTT message, a social network message, a text message, a multimedia message, an instant message, SMS, MMS, an electronic message, or the like. Messages 324 can be communicated to a recipient(s) or a recipient device(s) 312 via an appropriate service provider. A service provides message communication services for a user(s). Among other things, a service can facilitate delivery of messages 324 from a user or communication device 310 to a recipient or recipient device 312. By way of example only, a service may be a voice service, a text message service, a social network service, an electronic message service, an instant message service, or the like. A voice service provides voice services to users. An exemplary voice service might be a wireless service provider, such as Sprint®, AT&T®, etc. A text message service provides text messaging services to users. An exemplary text message service might be a wireless service provider, such as Sprint®, AT&T®, etc. A social network service provides social networking services to users. An exemplary social network service might be, for example, Facebook®, MySpace®, Twitter®, etc. An electronic message service provides email services to users. An exemplary electronic message service might be, for example, Hotmail®, Gmail®, etc. An instant message service provides instant messaging services to users. An exemplary instant messaging service might be, for example, AOL® Instant Messenger. As can be appreciated, in some cases, a service provider can provide more than one type of service. For example, a wireless service may provide voice and text message services to users.

In certain embodiments, a content provider 314 is configured with a temporal shifting agent. The content provider 314 may provide the communication device 310 access to high-definition content that may be included in message 324 that is transmitted to the recipient's device 312. As discussed above, the communication device 310 may detect that unfavorable network conditions exist and decide to create a small file having a low-definition version of the content. In some embodiments, the content provider 314 may be informed by the temporal shifting server 316 that communication device 310 is experiencing unfavorable network conditions. In turn, the temporal shifting server 316 may receive a version of content requested by the communication device 310 from the content provider 314 over connection 301. In one embodiment, the content provider 314 transmits a low resolution version of the content to the temporal shifting server 316. This low-definition version of the content is associated with the identifier 332 generated for the user. The communication device 310 may obtain the low resolution version of the content and corresponding identifier from the temporal shifting server 316. This allows the communication device 310 to preview a message 324 or edit the message to include text or additional formatting prior to delivery to the recipient 312. In turn, the temporal shifting agent 318, in one embodiment, provides the message 324 having the low-definition version of the content to optimization component 320, which optimizes the message 324 before the communication device 310 transmits optimized message 328 to the recipient's device 312.

After receiving the message, the recipient's device 312 may access a version of the content based on the identifier included in the message. In one embodiment, the recipient's device 312 may utilize the identifier and communicate with the temporal shifting server 316, which proxies the request to content provider 314 to obtain the high-definition version of the content. In some embodiments, a message 324 having the high-definition version of the content is transmitted, from content provider 314, to recipient's device 312 over connection 302 in response to the proxied request received from the temporal shifting server 316.

In some embodiment, when the network conditions are favorable the temporal shifting server 316 obtains a copy of the high-definition version of content authored on the communication device 310 or provided by the content provider 314. The temporal shifting server 316 may generate an identifier for the high-definition content received from the content communication device 310 or the content provider 314.

In yet another embodiment of the invention, a communication device having the temporal shifting agent is configured to deliver content to an intended recipient. The communication device checks network conditions. The communication device, also, determines whether network bandwidth is available to support delivery of high-definition content. When the network is able to transmit high-definition content, the communication device transmits high-definition content to the intended recipient. However, when the network is unable to transmit high-definition content, the communication device generates a low-definition version of the content and transmits low-definition versions of the content to the intended recipient.

Figure 4:
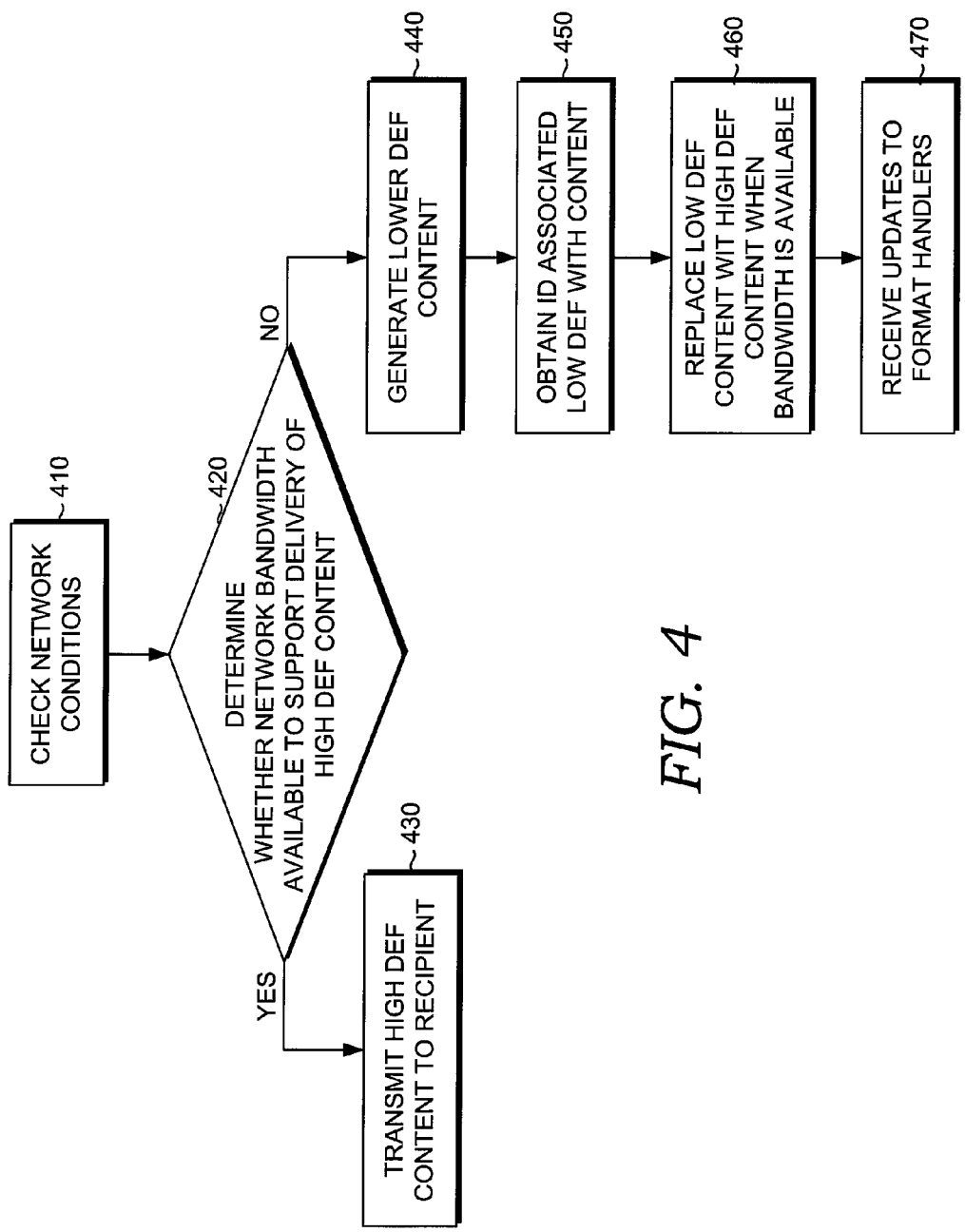
FIG. 4 is a flow diagram showing an illustrative method of delivery of content from a communication device in accordance with embodiments of the invention.

FIG. 4 is a flow diagram showing an illustrative method of delivery of content from a communication device in accordance with embodiments of the invention. In step 410, the communication device obtains conditions associated with a communication network connected to the communication device to check the conditions. The communication device determines whether conditions of the communication network, including available network bandwidth, support delivery of content stored in a large file, in step 420. The communication device may periodically request the conditions associated with the communication network. Alternatively, the communication device may periodically receive the conditions associated with the communication network automatically. The communication device may be a multimodal device and may be configured to communicate over radio, WiFi, or WiMax.

In some embodiments, the content stored in a large file is high-definition content. In step 430, when the conditions indicate that the communication network is able to transmit the large file, the communication device transmits the large file over the communication network to a recipient specified by a user of the communication device. When the conditions indicate that the communication network is unable to transmit the large file, in step 440, the communication device generates a small file that stores a version of the content. In one embodiment, the content stored in the small file is a low-definition version of the content. In other words, the small file contains a reduced resolution version of the content and the large file contains a high resolution version of the content.

The communication device may request an identifier from a temporal shifting server connected to the communication network. In step 450, the low-definition version of the content is associated with the identifier. In turn, the communication device transmits the small file over the communication network to the recipient specified by the user of the communication device. Additionally, the communication device may replace the small file with the large file when network conditions improve at step 460. In certain embodiments, the communication device provides a copy of the content transmitted to the intended recipient to the temporal shifting server. The user of the communication device may specify a length of time the content should be made available on the temporal shifting server.

In another embodiment of the invention, a temporal shifting server is configured to generate an identifier for a version of the content received from the communication device and to store the version of the content. The temporal shifting server may generate the identifier in response to a request from the communication device. In turn, at step 470 a temporal shifting server receives the version of the content and the identifier for storage in a database.

Figure 5:
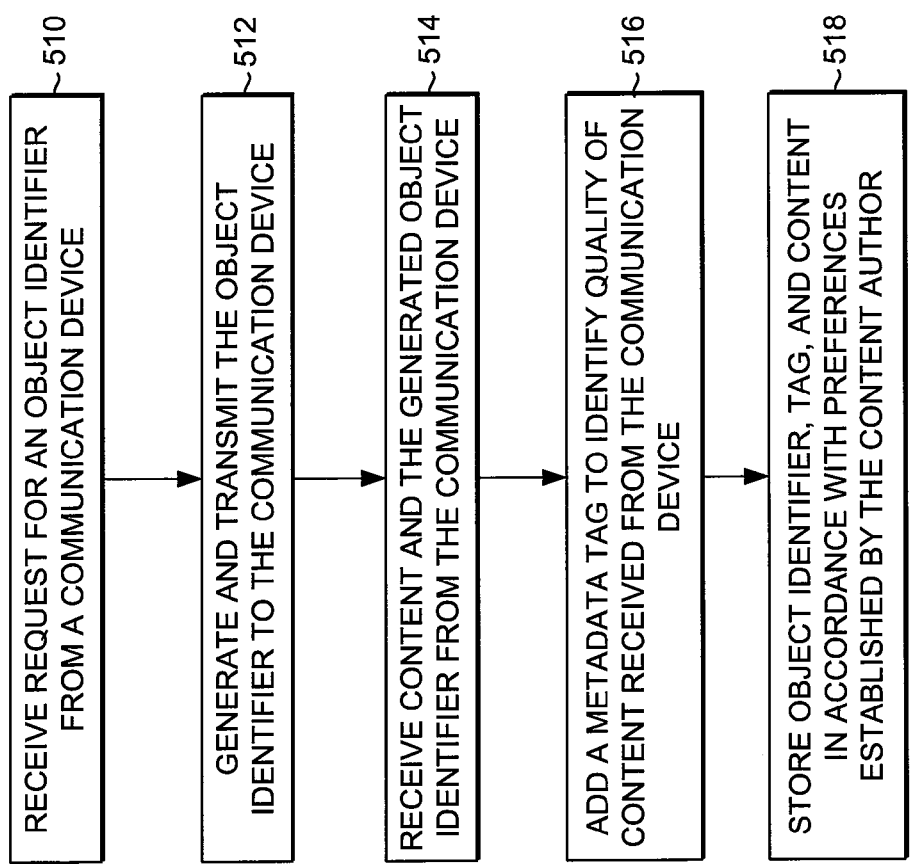
FIG. 5 is another flow diagram showing another illustrative method of creating object identifiers for content communicated across the exemplary network environment in accordance with embodiments of the invention.

FIG. 5 is another flow diagram showing another illustrative method of creating object identifiers for content communicated across the exemplary network environment in accordance with embodiments of the invention. The temporal shifting server may check conditions associated with a communication network connected to the communication device. In turn, the temporal shifting server may determine whether conditions of the communication network, including available network bandwidth, support delivery of content stored in a large file. When the conditions indicate that the communication network is able to transmit the large file, the temporal shifting server may receive a copy of the large file that is communicated over the communication network to a recipient specified by a user of the communication device. In some embodiments, the temporal shifting server receives a copy of the large file for storage with an object identifier associated with the communication device.

When the conditions indicate that the communication network is unable to transmit the large file, the temporal shifting server may receive a request for an object identifier from the communication device, in step 510. In step 512, the temporal shifting server generates the identifier for the version of the content. The temporal shifting server transmits the generated identifier to the communication device. The temporal shifting server may also check for new handlers associated with applications available on the communication device. The handlers may be utilized to generate smaller files having low-definition versions of the content created on the communication device. The temporal shifting server may transmit the new handlers to the communication device. In turn, the temporal shifting server receives a small file that stores a version of the content and the identifier from the communication device, in step 514.

In an embodiment, the small file contains a reduced resolution version of the content and the large file contains a high resolution version of the content. In step, 516, the temporal shifting server adds a metadata tag to identify the quality of the version of the content received from the communication device. In step 518, the temporal shifting server stores the small file. The temporal shifting server may receive an indication that specifies a length of time the content should remain available for the recipient. In one embodiment, the temporal shifting server may replace the small file for the large file when network conditions improve.

Embodiments of the invention provide a temporal shifting architecture that allow a user of a communication device having a temporal shifting agent to immediately transmit a version of a high-definition content to an intended recipient. For instance, a user may capture a video of an event, e.g., birthday event. The video may be a high-definition file that is in excess of 20 megabytes. The user may launch an MMS application on the communication device and attempt to send the high-definition video to a family member. The temporal shifting agent operating on the communication device may detect that less than favorable network conditions exists. Accordingly, the temporal shifting agent may send a low-definition version of the content to the family member. The low-definition version may include one or more frames extracted from the video and the audio from the video. The family member may receive the low-definition version of the video and be able to render the frames and the audio. In turn, the temporal shifting server may notify the family member when the high-definition video becomes available.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for delivering content from a communication device, the method comprising:
    obtaining conditions associated with a communication network connected to the communication device;
    determining whether conditions of the communication network, including available network bandwidth, support delivery of content stored in a large file;
    when the conditions indicate that the communication network is able to transmit the large file, transmitting the large file over the communication network to a recipient specified by a user of the communication device; and
    when the conditions indicate that the communication network is unable to transmit the large file:
        postponing transmission of the large file over the communication network to the recipient specified by a user of the communication device,
        generating a small file that stores a version of the content,
        generating a link that corresponds to the large file, which is accessible to the recipient via the link when the conditions indicate that the communication network is able to transmit the large file; and
        transmitting both the link and the small file together over the communication network to the recipient specified by the user of the communication device; and
    generating a notification when the conditions indicate that the communication network is able to transmit the large file.

2. The method of claim 1, further comprising:
requesting an identifier from a temporal shifting server connected to the communication network.

3. The method of claim 2, further comprising:
associating the content with the identifier.

4. The method of claim 2, further comprising:
specifying a length of time the content should be made available on the temporal shift server.

5. The method of claim 2, further comprising:
replacing the small file with the large file when network conditions improve.

6. The method of claim 5, wherein the small file contains a reduced resolution version of the content and the large file contains a high resolution version of the content.

7. The method of claim 2, further comprising:
providing a copy of the content to the temporal shift server.

8. The method of claim 1, wherein the communication device is a multimodal device and is configured to communicate over radio, WiFi, or WiMax.

9. The method of claim 1, wherein the communication device periodically requests the conditions associated with the communication network.

10. The method of claim 1, wherein the communication device periodically receives the conditions associated with the communication network automatically.

11. A computer system to deliver content from a communication device via a temporal shifting server, the system comprising:
a wireless device configured to check network conditions and to generate a low resolution version of high resolution content for transmission to a recipient based on the network conditions; and
a temporal shifting server configured to provide an identifier for the low resolution content and store the low resolution content in a database, wherein the temporal shifting server allows the recipient to obtain the low resolution content via the identifier, which is updated with the high resolution content when the network conditions improve and the temporal shifting server generates a notification when the network conditions improve such that the identifier redirects the wireless device from the low resolution file to the high resolution file when network conditions improve.

12. The system of claim 11, wherein the temporal shifting server updates the identifier to point only to the high resolution content.

13. The system of claim 11, further comprising:
a gateway configured to check a message header to determine whether a temporal shifting message is being transmitted and if the message header indicates that the message is a temporal shifting message, the gateway communicates with the temporal shifting server to receive a most-recent version of message content.

14. The system of claim 11, further comprising:
a content provider configured to check a message header to determine whether a temporal shifting message is being transmitted and if the message header indicates that the message is a temporal shifting message, the content provider communicates with the temporal shifting server to receive a most-recent version of message content, wherein the content provider stores the content associated with the identifier and enhances the message content based on additional services available to a user of the wireless device.

15. The system of claim 11, wherein the additional services include location data, friend tagging, and transaction processing.

16. One or more non-transitory computer-readable media having computer-executable instructions embodied thereon for performing a method to deliver content from a communication device, the method comprising:
checking conditions associated with a communication network connected to the communication device;
determining whether conditions of the communication network, including available network bandwidth, support delivery of content stored in a large file;
when the conditions indicate that the communication network is able to transmit the large file, receiving a copy of the large file that is communicated over the communication network to a recipient specified by a user of the communication device unless a storage policy for the recipient indicates that the large file violates the storage policy for the recipient; and
when the conditions indicate that the communication network is unable to transmit the large file:
(1) generating an identifier for the content,
(2) transmitting the identifier to the communication device,
(3) receiving a small file that stores a version of the content, and
(4) storing the small file in association with the identifier, which is a dynamic link that is updated to point to the large file instead of the small file when the conditions indicate that the communication network is able to transmit the large file unless the recipient's storage policy is violated.

17. The media of claim 16, further comprising:
replacing the small file for the large file when network conditions improve.

18. The media of claim 16, further comprising:
receiving an indication that specifies a length of time the content should remain available for the recipient.

19. The media of claim 16, further comprising:
checking for new handlers associated with applications available on the communication device; and
transmitting the new handlers to the communication device.

20. The media of claim 16, wherein the small file contains a reduced resolution version of the content and the large file contains a high resolution version of the content.

* * * * *